United States Patent
Shan

(10) Patent No.: US 12,097,535 B2
(45) Date of Patent: Sep. 24, 2024

(54) SORTING VEHICLE, GOODS SORTING SYSTEM, AND GOODS SORTING METHOD

(71) Applicant: Beijing Jingdong Qianshi Technology Co., Ltd., Beijing (CN)

(72) Inventor: Wenjun Shan, Beijing (CN)

(73) Assignee: Beijing Jingdong Qianshi Technology Co., Ltd., Beijing (CN)

( * ) Notice: Subject to any disclaimer, the term of this patent is extended or adjusted under 35 U.S.C. 154(b) by 83 days.

(21) Appl. No.: 17/920,341

(22) PCT Filed: Apr. 9, 2021

(86) PCT No.: PCT/CN2021/086060
§ 371 (c)(1),
(2) Date: Oct. 20, 2022

(87) PCT Pub. No.: WO2021/213187
PCT Pub. Date: Oct. 28, 2021

(65) Prior Publication Data
US 2023/0158551 A1    May 25, 2023

(30) Foreign Application Priority Data

Apr. 23, 2020   (CN) .......................... 202010328215.1

(51) Int. Cl.
*B07C 3/08*    (2006.01)
*B07C 5/36*    (2006.01)
(Continued)

(52) U.S. Cl.
CPC .............. *B07C 3/087* (2013.01); *B07C 3/085* (2013.01); *B07C 5/361* (2013.01); *B65G 17/345* (2013.01);
(Continued)

(58) Field of Classification Search
CPC .... B65G 2203/0283; B65G 2203/0208; B65G 2203/041; B65G 17/345; B65G 47/88; B07C 3/087; B07C 3/085; B07C 5/361
(Continued)

(56) References Cited

U.S. PATENT DOCUMENTS 3,550,748 A * 12/1970 Hauer .................. B65G 17/345
                                                            198/574
4,763,771 A *  8/1988 Geerts .................. B65G 47/965
                                                            198/574
(Continued)

FOREIGN PATENT DOCUMENTS

CN      104176429 A    12/2014
CN      205151021 U    4/2016
(Continued)

OTHER PUBLICATIONS

Chinese First Office Action dated Apr. 1, 2021 for Chinese Patent Application No. 202010328215.1.
(Continued)

*Primary Examiner* — James R Bidwell
(74) *Attorney, Agent, or Firm* — McCarter & English, LLP

(57) ABSTRACT

Provided are a sorting vehicle, a goods sorting system and a goods sorting method. The sorting vehicle includes a vehicle body, a belt-type conveying mechanism, an enclosing mechanism and a processor. The belt-type conveying mechanism includes a roller-type drive mechanism disposed on the vehicle body and an endless conveyor belt disposed on a roller of the roller-type drive mechanism. The moving direction of the endless conveyor belt is perpendicular to the traveling direction of the vehicle body. The enclosing mechanism is partially or entirely disposed on the endless conveyor belt, and is configured to form at least one enclosing region above the vehicle body. The processor is config-
(Continued)

ured to control the roller-type drive mechanism to drive the endless conveyor belt to move a preset distance to complete unloading of the goods within the enclosing region; and control the roller-type drive mechanism to complete resetting of the enclosing region.

16 Claims, 6 Drawing Sheets

(51) Int. Cl.
*B65G 17/34* (2006.01)
*B65G 47/88* (2006.01)
(52) U.S. Cl.
CPC ...... *B65G 47/88* (2013.01); *B65G 2203/0208* (2013.01); *B65G 2203/0283* (2013.01); *B65G 2203/041* (2013.01)
(58) Field of Classification Search
USPC ........................................ 198/370.03, 370.06
See application file for complete search history.

(56) References Cited

U.S. PATENT DOCUMENTS

| | | | | |
|---|---|---|---|---|
| 6,264,042 B1 * | 7/2001 | Cossey, Jr. | ............. | B07C 5/362 |
| | | | | 198/572 |
| 6,446,782 B1 * | 9/2002 | Patrick | .................. | B65G 47/71 |
| | | | | 198/370.06 |
| 8,413,787 B2 | 4/2013 | Brouwer et al. | | |
| 2003/0221935 A1 * | 12/2003 | Barklin | .................. | B65G 47/96 |
| | | | | 209/559 |
| 2010/0089274 A1 * | 4/2010 | Austin | ................. | B65G 17/345 |
| | | | | 105/238.1 |
| 2016/0052722 A1 * | 2/2016 | Fujihara | ................. | B65G 43/08 |
| | | | | 198/358 |

FOREIGN PATENT DOCUMENTS

| | | | |
|---|---|---|---|
| CN | 108499886 A | 9/2018 | |
| CN | 108554829 A | 9/2018 | |
| CN | 109720800 A | 5/2019 | |
| CN | 110976334 A | 4/2020 | |
| CN | 111729852 A | 10/2020 | |
| EP | 1897824 A1 * | 3/2008 | ........... B65G 17/345 |
| EP | 3055236 B1 | 11/2017 | |

OTHER PUBLICATIONS

PCT International Search Report dated Jul. 8, 2021, for International Patent Application No. PCT/CN2021/086060.
Chinese First Office Action dated Aug. 11, 2021 for Chinese Patent Application No. 202010328215.1.
Search Report from related European Patent Application No. 21791661.8 dated Apr. 19, 2024.

* cited by examiner

SORTING VEHICLE, GOODS SORTING SYSTEM, AND GOODS SORTING METHOD

CROSS-REFERENCE TO RELATED APPLICATIONS

This patent application is a National Stage Application filed under 35 U.S.C. § 371 based on International Application No. PCT/CN2021/086060, filed on Apr. 9, 2021, which application claims priority benefit to Chinese Patent Application No. 202010328215.1, filed on Apr. 23, 2020, the disclosures of which are incorporated herein by reference in their entireties.

TECHNICAL FIELD

Embodiments of the present application relate to the field of logistics, for example, to a sorting vehicle, a goods sorting system and a goods sorting method.

BACKGROUND

Sorting vehicles in the related art such as cross belt sorters mainly adopt carriers such as flaps or belts. However, neither a flap-type sorting vehicle nor a belt-type sorting vehicle is suitable for sorting easy-to-roll objects such as columns. The flap-type sorting vehicle performs sorting relying on goods sliding down due to gravity after the flap tilts, and thus the flap-type sorting vehicle cannot operate too fast overall, leading to a relatively low sorting efficiency. For the belt-type sorting vehicle, a relative motion occurs between the belt and the easy-to-roll objects due to relatively small friction, causing that the belt-type sorting vehicle also cannot convey easy-to-roll objects.

It can be seen that the following technical issue exists in the related art: the belt-type sorting vehicle cannot convey easy-to-roll objects due to the relative motion existing between the belt of the vehicle and the easy-to-roll objects.

SUMMARY

Embodiments of the present application provide a sorting vehicle, a goods sorting system and a goods sorting method, so that the problem in the related art is solved that the belt-type sorting vehicle cannot convey easy-to-roll objects due to the relative motion existing between the belt of the vehicle and the easy-to-roll objects.

In a first aspect, an embodiment of the present application provides a sorting vehicle. The sorting vehicle includes a vehicle body, a belt-type conveying mechanism, an enclosing mechanism and a processor.

The belt-type conveying mechanism includes a roller-type drive mechanism disposed on the vehicle body and an endless conveyor belt disposed on a roller of the roller-type drive mechanism, where the moving direction of the endless conveyor belt is perpendicular to the traveling direction of the vehicle body.

The enclosing mechanism is partially or entirely disposed on the endless conveyor belt and configured to form at least one enclosing region above the vehicle body to confine goods on part of the endless conveyor belt above the vehicle body.

The processor is configured to control, according to a received unloading signal, the roller-type drive mechanism to drive the endless conveyor belt to move a preset distance so that part or all of one enclosing region where goods are placed rotates below the roller to complete unloading of the goods within the one enclosing region; and control, according to a received resetting signal, the roller-type drive mechanism to drive the endless conveyor belt to perform a resetting movement to complete resetting of the one enclosing region.

In a second aspect, an embodiment of the present application further provides a goods sorting system. The goods sorting system includes at least one sorting vehicle according to the first aspect, a transfer line, at least one loading region, at least one unloading region, at least one code scanning module and a controller.

The transfer line is configured to drive the at least one sorting vehicle to travel.

The at least one loading region is disposed on one side or two sides of the transfer line and is configured to load goods on enclosing regions on the at least one sorting vehicle through a loading mechanism.

The at least one unloading region is disposed on one side or two sides of the transfer line and is configured to receive goods unloaded from the at least one sorting vehicle.

The at least one code scanning module is disposed above part of the transfer line between one loading region and one unloading region closest in front of the one loading region, and is configured to generate binding information according to scanned goods identification information and scanned enclosing region identification information.

The controller is configured to control the transfer line to drive the at least one sorting vehicle to travel: in response to determining that the at least one sorting vehicle passes a set loading region, control a loading mechanism within the set loading region to place to-be-sorted goods into an enclosing region above a vehicle body of one sorting vehicle: determine a corresponding unloading region of the to-be-sorted goods within the enclosing region according to the binding information; send an unloading signal to the one sorting vehicle in response to determining that the one sorting vehicle passes the corresponding unloading region so that the one sorting vehicle unloads the goods within the enclosing region to the corresponding unloading region according to the unloading signal before leaving the corresponding unloading region; and control the one sorting vehicle to complete resetting of the enclosing region before the one sorting vehicle reaches a matching loading region.

In a third aspect, an embodiment of the present application further provides a goods sorting method applied to the goods sorting system according to the second aspect. The goods sorting method includes steps described below.

The transfer line is controlled to drive the at least one sorting vehicle to travel.

In response to determining that the at least one sorting vehicle passes a set loading region, the loading mechanism within the set loading region is controlled to place to-be-sorted goods into an enclosing region above a vehicle body of one sorting vehicle.

A corresponding unloading region of the enclosing region is determined according to binding information from a code scanning module.

In response to determining that the one sorting vehicle travels to the corresponding unloading region, an unloading signal is sent to the one sorting vehicle so that the one sorting vehicle unloads, according to the unloading signal, the goods within the enclosing region to the corresponding unloading region before leaving the corresponding unloading region.

Before determining that the one sorting vehicle reaches a matching loading region, the one sorting vehicle is controlled to complete resetting of the enclosing region.

DETAILED DESCRIPTION

The technical schemes of the present application is clearly and completely described hereinafter through embodiments in conjunction with the drawings in the embodiments of the present application.

Embodiment One

Figure 1:
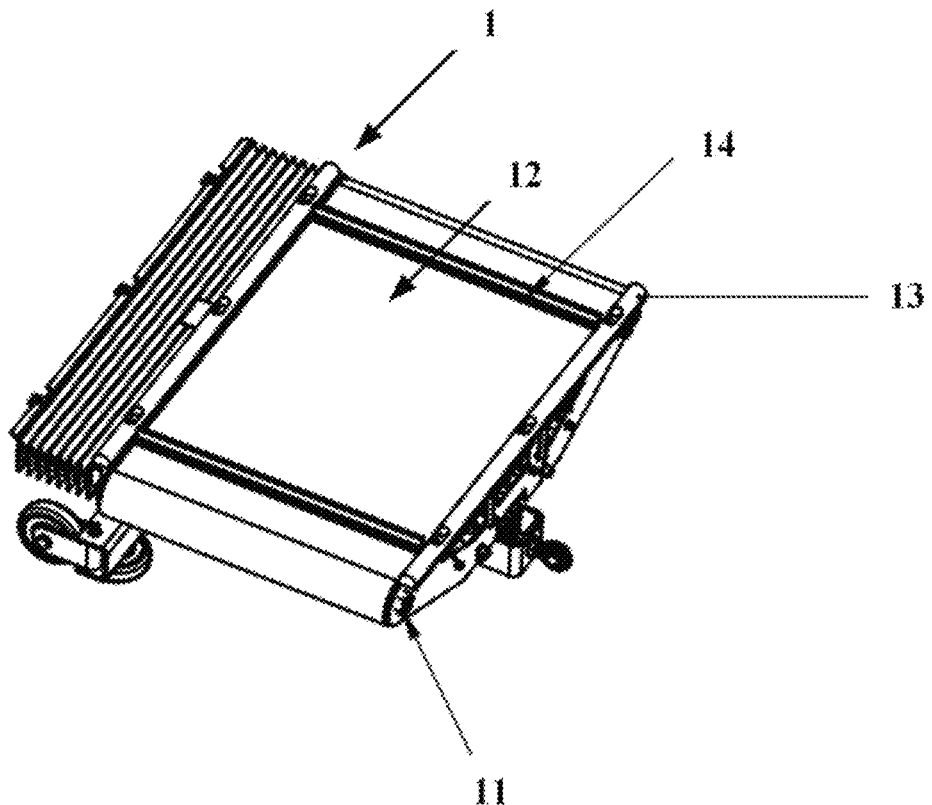
FIG. 1 is a structural diagram of a sorting vehicle according to embodiment one of the present application.
Figure 2:
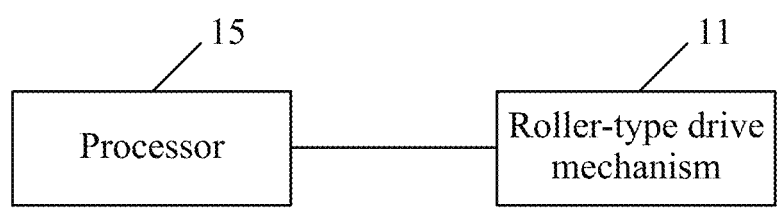
FIG. 2 is a control diagram of a sorting vehicle according to embodiment one of the present application.
Figure 3:
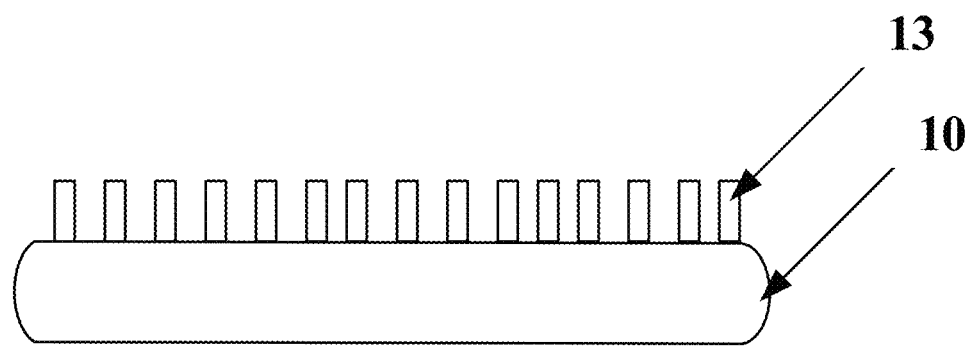
FIG. 3 is a side view of a sorting vehicle according to embodiment one of the present application.

The embodiment of the present application provides a sorting vehicle 1. As shown in FIGS. 1 to 3, the sorting vehicle 1 includes a vehicle body 10, a belt-type conveying mechanism, an enclosing mechanism and a processor 15. The belt-type conveying mechanism includes a roller-type drive mechanism 11 disposed on the vehicle body 10 and an endless conveyor belt 12 disposed on a roller of the roller-type drive mechanism 11, where the moving direction of the endless conveyor belt 12 is perpendicular to the traveling direction of the vehicle body 10. The enclosing mechanism is partially or entirely disposed on the endless conveyor belt 12, and is configured to form at least one enclosing region above the vehicle body 10 to confine goods on part of the endless conveyor belt above the vehicle body 10. The processor 15 is configured to control, according to a received unloading signal, the roller-type drive mechanism 11 to drive the endless conveyor belt 12 to move a preset distance so that part or all of the enclosing region where goods are placed rotates below the roller to complete unloading of the goods within the enclosing region; and control, according to a received resetting signal, the roller-type drive mechanism 11 to drive the endless conveyor belt 12 to perform a resetting movement to complete resetting of the enclosing region.

In an embodiment, the roller-type drive mechanism 11 may be a servo motor.

The enclosing mechanism includes stopping bars 13 (referring to FIG. 1 and FIG. 3) disposed on the vehicle body 10 or on the endless conveyor belt 12 and perpendicular to the traveling direction of the vehicle body 10.

It is to be understood that if the stopping bars 13 are disposed on the vehicle body 10, the stopping bars 13 may adopt structures such as strip-type plates (referring to FIG. 1) or strip-type columns, or may of course adopt a toothed structure shown in FIG. 3. If the stopping bars 13 are disposed on the endless conveyor belt 12, the stopping bars may be a toothed structure, so as to prevent a rigid strip structure from causing the endless conveyor belt to be incapable of rotating on the periphery of the roller, and prevent a flexible strip structure from being incapable of effectively enclosing easy-to-roll objects. Moreover, in an embodiment, the length of the stopping bar may be the same as the length of the vehicle body.

Figure 4A:
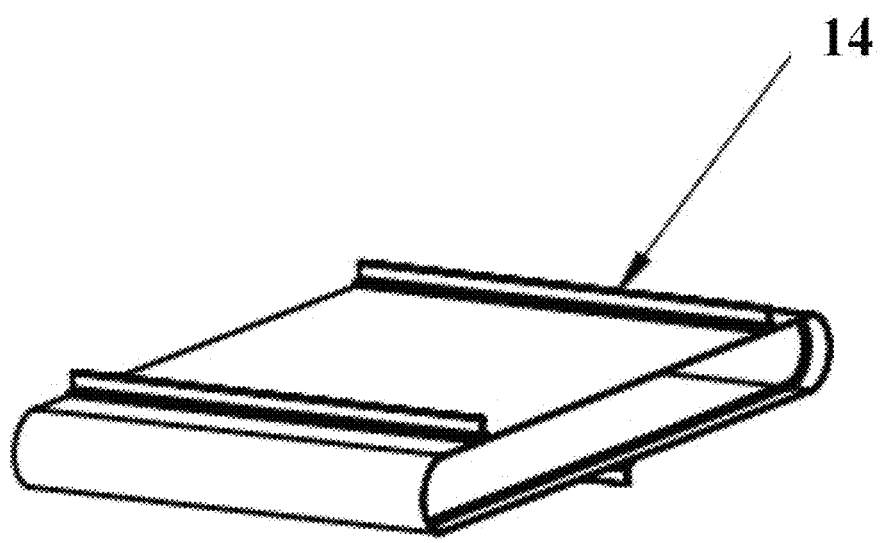
FIG. 4A is a front view of stopping flanges on an endless conveyor belt according to embodiment one of the present application.
Figure 4B:
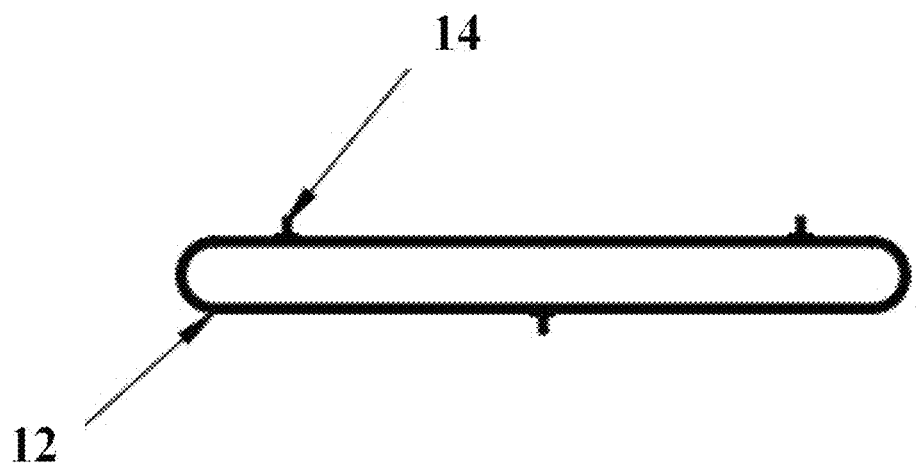
FIG. 4B is a right side view of stopping flanges on an endless conveyor belt according to embodiment one of the present application.
Figure 4C:
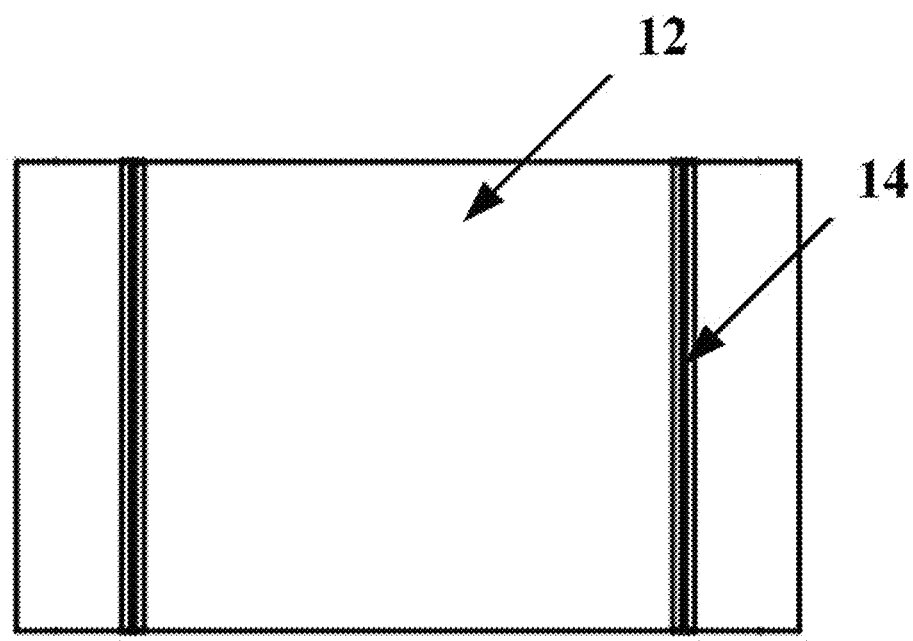
FIG. 4C is a top view of stopping flanges on an endless conveyor belt according to embodiment one of the present application.

The enclosing mechanism further includes at least two stopping flanges 14 (referring to FIG. 1) disposed on the endless conveyor belt 12 and parallel to the traveling direction of the vehicle body, and the at least two stopping flanges 14 and the stopping bars 13 can form at least one enclosing region above the vehicle body. The number of stopping flanges 14 disposed on the endless conveyor belt 12 may be selected according to actual situations. If two stopping flanges are disposed on the endless conveyor belt, the shortest distance between the two stopping flanges is less than or equal to the length of the endless conveyor belt above the vehicle body; if at least three stopping flanges are disposed on the endless conveyor belt, in an embodiment, the at least three stopping flanges may be disposed evenly (referring to FIG. 4A, FIG. 4B and FIG. 4C) along the length direction of the endless conveyor belt, and for this number of the stopping flanges, in an embodiment, the stopping flanges form only one enclosing region above the vehicle body. If at least two enclosing regions are formed above the vehicle body, the corresponding relationship between the goods and the corresponding enclosing region in the sorting vehicle needs to be determined, and then the moving direction of the endless conveyor belt when the goods are unloaded is determined.

In an embodiment, the preset distance may be at least the shortest distance between adjacent two stopping flanges. In some embodiments, the preset distance is also set to half the length of the endless conveyor belt. In some embodiments, the preset distance is also set to be less than the shortest distance between adjacent two stopping flanges, and of course, this case is applicable to sorting goods having relatively large volumes. During the unloading process, as the endless conveyor belt operates, a stopping flange of the enclosing region rotates below the roller and another stopping flange moves above the vehicle body, the suspended part of the goods gradually increases, and then the goods leave the endless conveyor belt under gravity.

When goods are sorted by using the sorting vehicle, a goods loading process, a loaded goods operation process, a goods unloading process and an enclosing region resetting process are involved. During the goods loading process, the enclosing region above the vehicle body of the sorting vehicle receives the loaded goods. During the loaded goods operation process, the endless conveyor belt may optionally be in a non-driving state, so that the goods are always located in the enclosing region above the vehicle body. During the goods unloading process, the processor may optionally control, according to the received unloading signal, the servo motor to drive the endless conveyor belt to move, and a moving distance is greater than or equal to the length of the enclosing region where the goods are located so that the enclosing region where the goods are placed entirely rotates below the roller to complete the unloading of the goods within the enclosing region. During the enclosing region resetting process, the processor controls, according to the received resetting signal, the servo motor to drive the endless conveyor belt to perform the resetting movement so that the enclosing region is formed above the vehicle body again. The resetting signal may include only the moving distance of the endless conveyor belt, and at this time, the moving direction is a preset unloading direction. The resetting signal may also include both the moving distance of the endless conveyor belt and an unloading direction.

The moving direction of the endless conveyor belt during the resetting process of the enclosing region may be the same as or opposite to the moving direction of the endless conveyor belt during the unloading process, as long as the enclosing region is formed above the vehicle body again. If the moving direction of the endless conveyor belt during the resetting process is opposite to the moving direction of the endless conveyor belt during the unloading process, the servo motor rotates in the direction opposite to the moving direction by the corresponding number of revolutions during resetting, so that the enclosing region is reset.

According to the technical scheme of the sorting vehicle provided in the embodiment of the present application, at least one enclosing region is formed above the vehicle body through the enclosing mechanism, and goods are confined on the part of the endless conveyor belt above the vehicle body. In this manner, even a relative motion occurs between easy-to-roll goods and the endless conveyor belt, the easy-to-roll goods can only move within the enclosing region due to the existence of the enclosing region during the traveling of the sorting vehicle, and will not leave the endless conveyor belt due to the relative motion between the easy-to-roll goods and the endless conveyor belt. Therefore, the application range of the sorting vehicle adopting the endless conveyor belt is expanded to the field of easy-to-roll goods sorting.

Embodiment Two

Figure 5:
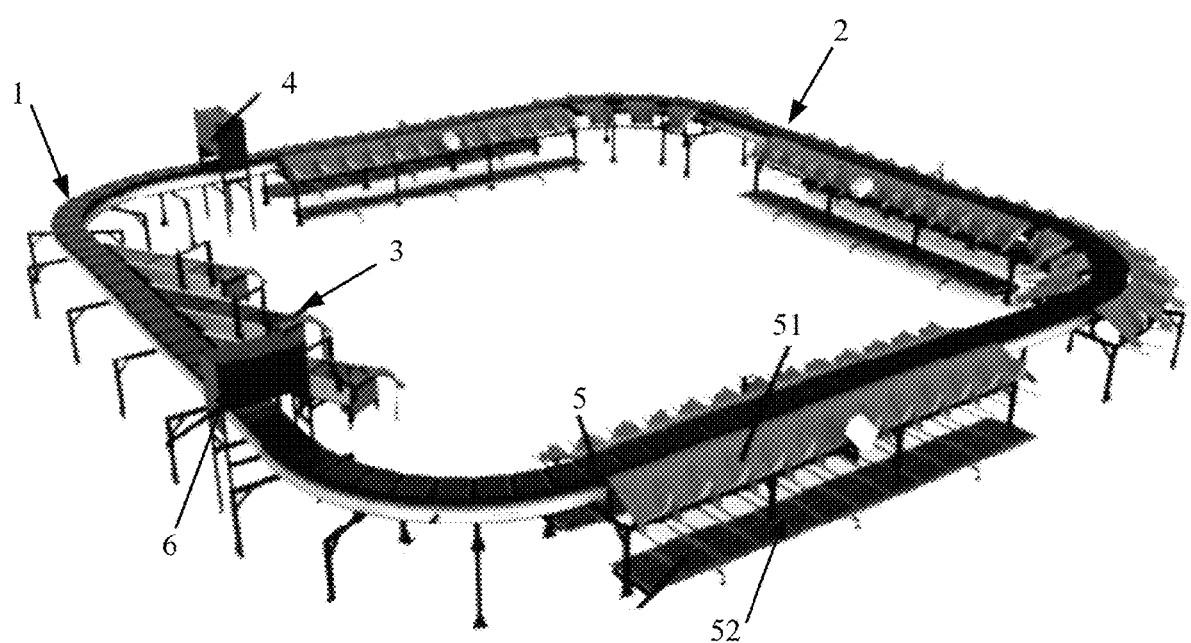
FIG. 5 is a structural diagram of a goods sorting system according to embodiment two of the present application.
Figure 6:
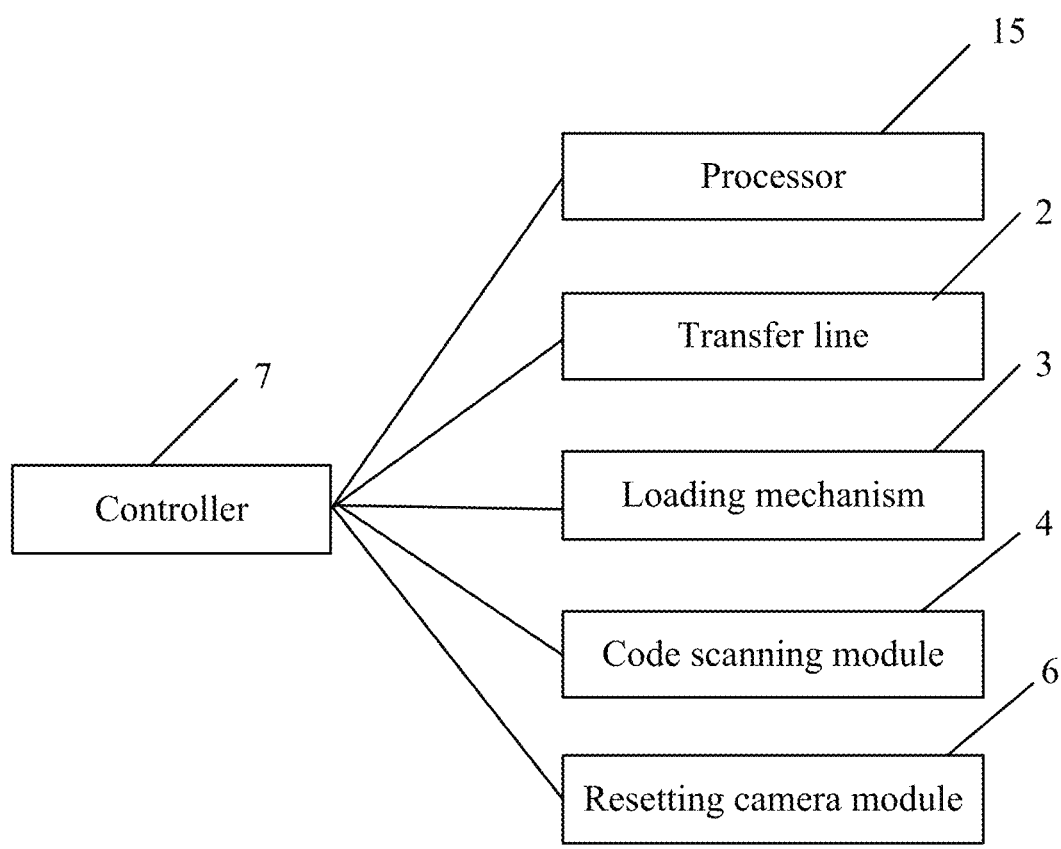
FIG. 6 is a control diagram of a goods sorting system according to embodiment two of the present application.

The embodiment of the present application provides a goods sorting system. As shown in FIG. 5 and FIG. 6, the system includes a transfer line 2, a controller 7, at least one sorting vehicle 1 described in the preceding embodiment, at least one loading region 3, at least one code scanning module 4 and at least one unloading region 5. The transfer line 2 is configured to drive the sorting vehicle 1 to travel. The loading region 3 is disposed on one side or two sides of the transfer line 2 and is configured to load goods on an enclosing region on the sorting vehicle 1 through a loading mechanism. The code scanning module 4 is disposed above the transfer line between a loading region and an unloading region closest in front of the loading region, and is configured to generate binding information according to scanned goods identification information and scanned enclosing region identification information. The unloading region 5 is disposed on one side or two sides of the transfer line and is configured to receive goods unloaded from the sorting vehicle. The controller 7 is configured to control the transfer line 2 to drive the sorting vehicle 1 to travel; in response to determining that the sorting vehicle passes a set loading region 3, control a loading mechanism within the set loading region to place to-be-sorted goods into the enclosing region above the vehicle body of the sorting vehicle; determine an unloading region 5 corresponding to the goods within the enclosing region according to the binding information; send an unloading signal to the sorting vehicle in response to determining that the sorting vehicle passes the corresponding unloading region 5 so that the sorting vehicle unloads the goods within the enclosing region to the corresponding unloading region according to the unloading signal before leaving the corresponding unloading region; and control the sorting vehicle to complete resetting of the enclosing region before the sorting vehicle reaches a matching loading region.

The transfer line may adopt a circular transfer line or a linear transfer line. Correspondingly, the circular transfer line drives the sorting vehicle to perform a circular movement, and the linear transfer line drives the sorting vehicle to perform a linear movement. The circular transfer line is taken as an example for illustration in the embodiment. The loading region and the unloading region may adopt the related art, which is not described in detail in the embodiment.

It is to be understood that the code scanning module 4 is provided so that the controller 7 positions the position of the goods through the binding information, extracts the goods identification information and the corresponding enclosing region from the binding information, and then determines the unloading region corresponding to the enclosing region according to a stored corresponding relationship between pieces of the goods identification information and unloading regions and the goods identification information in the binding information.

As shown in FIG. 5, the unloading region 5 includes goods boxes 52, and chutes 51 connecting the goods boxes 52 and the endless conveyor belts of the sorting vehicles. After leaving the endless conveyor belt, the goods fall along the chutes 51 into the goods boxes 52. The chutes can effectively slow down the falling of the goods, so as to avoid the damage caused by the goods falling directly from the endless conveyor belts into the goods boxes.

The matching loading region is a loading region allocated by the controller to the sorting vehicle when the sorting vehicle completes goods unloading in the unloading region. The matching loading region may be an adjacent loading region or a remote loading region. It is to be understood that if the goods sorting system includes only one loading region, regardless of in which unloading region the sorting vehicle performs unloading, the resetting of the enclosing region needs to be completed before the sorting vehicle reaches that loading region.

When the enclosing region is reset, the controller may record a distance that the roller-type drive mechanism is controlled to drive the endless conveyor belt to move during unloading and then drive the endless conveyor belt to move the distance in an opposite direction. It is to be understood that for such a resetting manner, resetting errors will continuously accumulate as the number of times of the resetting by the sorting vehicle increases, leading to increasingly low resetting accuracy.

To improve the accuracy of resetting the enclosing region, the system further includes a resetting camera module 6. The resetting camera module 6 is disposed above the transfer line 2 between a loading region 3 and an unloading region closest behind the loading region 3, and is configured to capture a first top view image of the sorting vehicle, perform goods identification and enclosing region position calculation according to the first top view image, and send a resetting notification signal to the controller when a goods identification result is that no goods are placed, where the resetting notification signal includes a resetting distance corresponding to the current position of the enclosing region. The controller is further configured to send a resetting signal to a processor of the sorting vehicle according to the resetting notification signal so that the processor controls, according to the received resetting signal, the roller-type drive mechanism to drive the endless conveyor belt to perform a resetting movement to complete the resetting of the enclosing region.

The "behind" and "in front of" in the embodiment are defined according to the operation direction of the circular transfer line and the current position of the sorting vehicle. For example, the position relationship of the resetting camera module 6, the loading region 3 and the unloading region 5 closest to the loading region may also be described as follows: during driving, the sorting vehicle first passes the unloading region 5 closest to the loading region 3, then passes the resetting camera module 6 and finally passes the loading region 3. The position relationship of the loading region 3, the code scanning module 4 and the unloading region 5 closest in front of the loading region 3 may be described as follows: during driving, the sorting vehicle 1 first passes the loading region 3, then passes the code scanning module 4 and finally passes the unloading region 5 located in front of the loading region and closest to the loading region.

The resetting signal may only include the resetting distance and not include a resetting direction, and at this time, the resetting direction is a preset resetting direction. If the resetting signal includes the resetting distance and the resetting direction, the processor of the sorting vehicle determines the number of revolutions of the servo motor according to the resetting distance in the resetting signal, and then controls the servo motor to rotate by the corresponding number of revolutions along the resetting direction, that is, by default, the servo motor drives the conveyor belt to move the resetting distance along the resetting direction, so that the resetting of the enclosing region is completed.

The color of the enclosing mechanism and the color of goods are different from the color of the endless conveyor belt: therefore, in a grayscale image, the gray scale of the enclosing mechanism and the gray scale of the goods are both different from the gray scale of the endless conveyor belt, and the resetting camera module performs the goods identification in the manner described below.

In the first top view image, whether the length and the area of a region having the same gray scale as the enclosing mechanism are the same as a stored length of a stopping flange of the enclosing region and a stored area of the enclosing region is calculated, respectively. In a case where in the first top view image, the length of the region having the same gray scale as the enclosing mechanism is the same as the stored length of the stopping flange of the enclosing region and the area of the region having the same gray scale as the enclosing mechanism is the same as the stored area of the enclosing region, it is determined that no goods are placed within the enclosing region above the vehicle body of the sorting vehicle. In a case where in the first top view image, the length of the region having the same gray scale as the enclosing mechanism is not the same as the stored length of the stopping flange of the enclosing region, and/or the area of the region having the same gray scale as the enclosing mechanism is not the same as the stored area of the enclosing region, it is determined that goods are placed within the enclosing region above the vehicle body of the sorting vehicle.

The resetting camera module determines the resetting distance in the manner described below.

At least one stopping flange of the enclosing region is positioned in the first top view image; and the resetting distance is determined according to a preset resetting direction, the position of the at least one positioned stopping flange and an expected position of the at least one positioned stopping flange.

Due to the relative motion between a roller and the endless conveyor belt, although the servo motor rotates by the corresponding number of revolutions, the distance that the servo motor drives the endless conveyor belt to move is not the accurate resetting distance. Therefore, to improve the accuracy of the resetting of the enclosing region, in some embodiments, the system further includes a tuning camera module. The tuning camera module is disposed above the transfer line between the resetting camera module and a loading region closest to the resetting camera module, and is configured to capture a second top view image of the sorting vehicle, calculate the current position of the enclosing region according to the second top view image, and send a tuning notification signal to the controller, where the tuning notification signal includes a tuning distance corresponding to the current position of the enclosing region. The controller is further configured to send a tuning signal to the processor of the sorting vehicle according to the tuning notification signal so that the processor controls, according to the tuning signal, the roller-type drive mechanism to drive the endless conveyor belt to move the tuning distance to update a resetting position of the enclosing region.

The tuning camera module determines the tuning distance in the manner described below.

At least one stopping flange of the enclosing region is positioned in the second top view image; and the tuning distance is determined according to a preset tuning direction, the position of the at least one positioned stopping flange and an expected position of the at least one positioned stopping flange. According to the technical scheme of the goods sorting system provided in the embodiment of the present application, compared with the related art, the controller controls the sorting vehicle provided with the enclosing region above the vehicle body to travel on the circular transfer line, loads easy-to-roll goods into the enclosing region through the loading region during the traveling process, determines the position of the enclosing region where the goods are located and the corresponding unloading region through the binding information of the code scanning module, unloads the goods within the enclosing region to the corresponding unloading region when the enclosing region reaches the corresponding unloading region, and controls the sorting vehicle to complete the resetting of the enclosing region before the empty enclosing region moves to any loading region. Due to the existence of the enclosing region, when the sorting vehicle drives the easy-to-roll goods to move on the circular transfer line, the easy-to-roll goods can only move within the enclosing region, and will not leave the endless conveyor belt due to the relative motion between the easy-to-roll goods and the endless conveyor belt. Therefore, the application of the sorting vehicle adopting the endless conveyor belt is expanded to the field of easy-to-rolling goods sorting.

Embodiment Three

Figure 7:
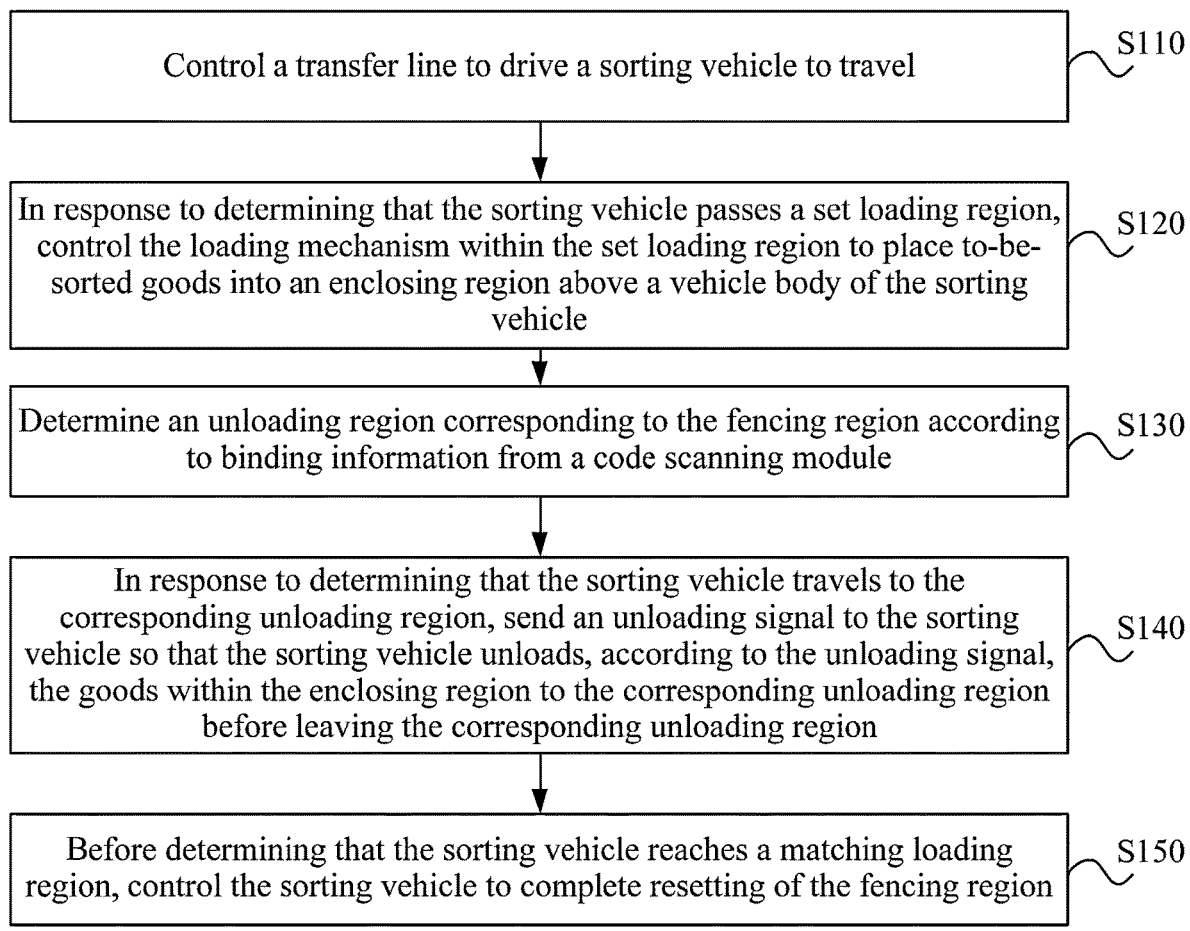
FIG. 7 is a flowchart of a goods sorting method according to embodiment three of the present disclosure.

FIG. 7 is a flowchart of a goods sorting method according to embodiment three of the present disclosure. The technical scheme of the embodiment is applicable to a case where the goods sorting system of the preceding embodiment automatically performs sorting of easy-to-roll goods. The method may be performed by the controller of the goods sorting system. Referring to FIG. 5 and FIG. 6, the method includes steps described below.

In S110, a transfer line is controlled to drive a sorting vehicle to travel.

The transfer line may be a circular transfer line or a linear transfer line. In the embodiment, the transfer line being a circular transfer line is taken as an example for illustration.

The sorting vehicle 1 is disposed on the circular transfer line 2, and the circular transfer line 2 drives the sorting vehicle 1 to perform a circular movement at a constant speed.

In S120, in response to determining that the sorting vehicle passes a set loading region, the loading mechanism within the set loading region is controlled to place to-be-sorted goods into an enclosing region above a vehicle body of the sorting vehicle.

Since the traveling speed of the sorting vehicle 1 on the circular transfer line 2 is known, in a case where the starting position of the sorting vehicle is known, the position of the sorting vehicle on the circular transfer line can be determined according to the traveling time of the sorting vehicle. When the controller determines that the sorting vehicle passes the set loading region, the controller controls the loading mechanism within the set loading region to place the to-be-sorted goods into the enclosing region above the vehicle body of the sorting vehicle. It is to be understood that if multiple enclosing regions exist above the vehicle body, in an embodiment, the loading mechanism may place the to-be-sorted goods into a nearby enclosing region.

In S130, an unloading region corresponding to the enclosing region is determined according to binding information from a code scanning module.

The controller positions the position of the goods through the binding information, extracts goods identification information and the corresponding enclosing region from the binding information, and then determines the unloading region corresponding to the enclosing region according to a stored corresponding relationship between pieces of goods identification information and unloading regions and the goods identification information in the binding information.

In S140, in response to determining that the sorting vehicle travels to the corresponding unloading region, an unloading signal is sent to the sorting vehicle so that the sorting vehicle unloads, according to the unloading signal, the goods within the enclosing region to the corresponding unloading region before leaving the corresponding unloading region.

In some embodiments, the position where the code scanning module 4 is located is taken as the starting position, in a case where the traveling speed of the circular transfer line is known, the controller may determine the position of the enclosing region where the goods are located according to the current moment and the scanning time of the goods identification information or the current moment and the generation time of the binding information.

In an embodiment, before in response to determining that the sorting vehicle travels to the corresponding unloading region, the unloading signal is sent to the sorting vehicle, the step described below is further included.

The position of the goods is positioned according to the binding information determined by the code scanning module and the traveling speed of the sorting vehicle.

When determining that the enclosing region where the goods are located reaches a matching unloading region 5, that is, when determining that the sorting vehicle where the goods are located reaches the matching unloading region, the controller sends the unloading signal to the sorting vehicle so that the sorting vehicle performs unloading according to the unloading signal, and unloads the goods within the enclosing region to the corresponding unloading region before leaving the corresponding unloading region.

It is to be understood that if both the inner side and outer side of the circular transfer line are provided with unloading regions, the unloading signal needs to include an unloading direction. The processor of the sorting vehicle controls, according to the unloading direction in the unloading signal, the servo motor to drive the endless conveyor belt to rotate along the unloading direction by a preset distance.

In S150, before determining that the sorting vehicle reaches a matching loading region, the sorting vehicle is controlled to complete resetting of the enclosing region.

After the sorting vehicle completes the unloading of the goods, there may be no complete enclosing region above the vehicle body, so that it is required to control the sorting vehicle to complete the resetting of the enclosing region according to a resetting notification signal sent by a resetting camera module 6 before the sorting vehicle reaches the matching loading region.

The matching loading region is a loading region allocated by the controller to the sorting vehicle when the sorting vehicle completes goods unloading. The loading region may be an adjacent loading region or a remote loading region. It is to be understood that if a goods sorting system includes only one loading region, regardless of in which unloading region the sorting vehicle performs unloading, the resetting of the enclosing region needs to be completed before the sorting vehicle reaches that loading region.

After receiving the resetting notification signal, the controller sends a resetting signal to the sorting vehicle according to the resetting notification signal. The resetting signal includes the resetting distance corresponding to the current position of the enclosing region. The processor of the sorting vehicle determines the number of resetting revolutions of the servo motor according to the resetting distance, and then controls the servo motor to rotate by the corresponding number of resetting revolutions along a preset direction to reset the enclosing region.

Due to a relative motion between the roller of the servo motor and the endless conveyor belt, although the servo motor rotates by the corresponding number of resetting revolutions, the servo motor does not drive the endless conveyor belt to move the resetting distance. Therefore, in some embodiments, the controller needs to perform resetting tuning of the enclosing region before the sorter vehicle reaches the matching loading region. In the resetting tuning process, after receiving a tuning notification signal sent by a tuning camera module, the controller sends a tuning signal to the sorting vehicle according to the tuning notification signal. The tuning signal includes a tuning distance corresponding to the current position of the enclosing region. After receiving the tuning signal, the processor of the sorting vehicle determines the number of tuning revolutions of the servo motor according to the tuning distance in the tuning signal, and then controls the servo motor to rotate by the number of tuning revolutions to update a resetting position of the enclosing region.

For the manner for the resetting camera module to determine the resetting distance and the manner for the tuning module to determine the tuning distance, reference may be made to the preceding embodiment, which is not repeated here in the embodiment.

According to the technical scheme of the goods sorting method provided in the embodiment of the present application, compared with the related art, the controller controls the sorting vehicle provided with the enclosing region above the vehicle body to travel on the circular transfer line, loads easy-to-roll goods into the enclosing region through the loading region during the operation process, determines the position of the enclosing region where the goods are located and the corresponding unloading region through the binding information of the code scanning module, unloads the goods within the enclosing region to the corresponding unloading region when the enclosing region reaches the corresponding unloading region, and controls the sorting vehicle to complete the resetting of the enclosing region before the empty enclosing region moves to the loading region. Due to the existence of the enclosing region, when the sorting vehicle drives the easy-to-roll goods to move on the circular transfer line, the easy-to-roll goods can only move within the enclosing region, and will not leave the endless conveyor belt due to the relative motion between the easy-to-roll goods and the endless conveyor belt. Therefore, the application of the sorting vehicle adopting the endless conveyor belt is expanded to the field of easy-to-rolling goods sorting.

What is claimed is:

1. A goods sorting system, comprising:
   at least one sorting vehicle, wherein each of the at least one sorting vehicle comprises:
   a vehicle body;
   a belt-type conveying mechanism comprising a roller-type drive mechanism disposed on the vehicle body and an endless conveyor belt disposed on a roller of the roller-type drive mechanism, wherein a moving direction of the endless conveyor belt is perpendicular to a traveling direction of the vehicle body;
   an enclosing mechanism partially or entirely disposed on the endless conveyor belt and configured to form at least one enclosing region above the vehicle body to confine goods on part of the endless conveyor belt above the vehicle body; and
   a processor configured to control, according to a received unloading signal, the roller-type drive mechanism to drive the endless conveyor belt to move a preset distance so that part or all of one enclosing region of the at least one enclosing region where goods are placed rotates below the roller to complete unloading of the goods within the one enclosing region; and control, according to a received resetting a signal, the roller-type drive mechanism to drive the endless conveyor belt to perform a resetting movement to complete resetting of the one enclosing region;
   a transfer line configured to drive the at least one sorting vehicle to travel;
   at least one loading region disposed on one side or two sides of the transfer line and configured to load goods on enclosing regions on the at least one sorting vehicle through a loading mechanism;
   at least one unloading region disposed on one side or two sides of the transfer line and configured to receive goods unloaded from the at least one sorting vehicle;
   at least one code scanning module, wherein each of the at least one code scanning module is disposed above part of the transfer line between one loading region of the at least one loading region and one unloading region of the at least one unloading region closest in front of the one loading region, and configured to generate binding information according to scanned goods identification information and scanned enclosing region identification information; and
   a controller configured to control the transfer line to drive the at least one sorting vehicle to travel; in response to determining that the at least one sorting vehicle passes a set loading region among the at least one loading region, control a loading mechanism within the set loading region to place to-be-sorted goods into an enclosing region above a vehicle body of one sorting vehicle; determine a corresponding unloading region of the goods within the enclosing region according to the binding information; send an unloading signal to the one sorting vehicle in response to determining that the one sorting vehicle passes the corresponding unloading region so that the one sorting vehicle unloads the goods within the enclosing region to the corresponding unloading region according to the unloading signal before leaving the corresponding unloading region; and control the one sorting vehicle to complete resetting of the enclosing region before the one sorting vehicle reaches a matching loading region among the at least one loading region.

2. The system according to claim 1, further comprising:
   a resetting camera module disposed above part of the transfer line between one loading region of the at least one loading region and one unloading region of the at least one unloading region closest behind the one loading region, and configured to capture a first top view image of the one sorting vehicle, perform goods identification and enclosing region position calculation according to the first top view image, and send a resetting notification signal to the controller when a goods identification result is that no goods are placed, wherein the resetting notification signal comprises at least a resetting distance corresponding to a current position of the enclosing region;
   wherein the controller is further configured to send a resetting signal to a processor of the one sorting vehicle according to the resetting notification signal so that the processor controls, according to the received resetting signal, a roller-type drive mechanism to drive an endless conveyor belt to perform a resetting movement to complete the resetting of the enclosing region.

3. The system according to claim 2, further comprising:
   a tuning camera module disposed above part of the transfer line between the resetting camera module and one loading region of the at least one loading region closest to the resetting camera module, and configured to capture a second top view image of the one sorting vehicle, calculate the current position of the enclosing region according to the second top view image, and send a tuning notification signal to the controller, wherein the tuning notification signal comprises a tuning distance corresponding to the current position of the enclosing region;
   wherein the controller is further configured to send a tuning signal to the processor of the one sorting vehicle according to the tuning notification signal so that the processor controls, according to the tuning signal, the roller-type drive mechanism to drive the endless conveyor belt to move the tuning distance to update a resetting position of the enclosing region.

4. The system according to claim 2, wherein a color of an enclosing mechanism and a color of the goods are each different from a color of the endless conveyor belt; and
   the resetting camera module is configured to perform the goods identification in a following manner:
   calculating, in the first top view image, whether a length of a region having a same gray scale as the enclosing mechanism is the same as a stored length of a stopping flange of the enclosing region and whether an area of the region having the same gray scale as the enclosing mechanism is the same as a stored area of the enclosing region, respectively; and
   in response to determining that in the first top view image, the length of the region having the same gray scale as the enclosing mechanism is the same as the stored length of the stopping flange of the enclosing region and the area of the region having the same gray scale as the enclosing mechanism is the same as the stored area of the enclosing region, determining that no goods are placed within the enclosing region above the vehicle body of the one sorting vehicle;

in response to determining that in the first top view image, at least one of the following exists: the length of the region having the same gray scale as the enclosing mechanism not being the same as the stored length of the stopping flange of the enclosing region, or the area of the region having the same gray scale as the enclosing mechanism not being the same as the stored area of the enclosing region, determining that goods are placed within the enclosing region above the vehicle body of the one sorting vehicle.

5. The system according to claim 4, wherein the resetting camera module is configured to determine the resetting distance in a following manner:

positioning at least one stopping flange of the enclosing region in the first top view image; and determining the resetting distance according to a preset resetting direction, a position of the at least one positioned stopping flange and an expected position of the at least one positioned stopping flange.

6. A goods sorting method, applied to the goods sorting system according to claim 1 and comprising:

controlling the transfer line to drive the at least one sorting vehicle to travel;

in response to determining that the at least one sorting vehicle passes a set loading region, controlling the loading mechanism within the set loading region to place to-be-sorted goods into an enclosing region above a vehicle body of one sorting vehicle;

determining a corresponding unloading region of the enclosing region according to binding information from a code scanning module;

in response to determining that the one sorting vehicle travels to the corresponding unloading region, sending an unloading signal to the one sorting vehicle so that the one sorting vehicle unloads, according to the unloading signal, the goods within the enclosing region to the corresponding unloading region before leaving the corresponding unloading region; and before determining that the one sorting vehicle reaches a matching loading region, controlling the one sorting vehicle to complete resetting of the enclosing region.

7. The method according to claim 6, wherein before the one sorting vehicle reaches the set loading region, controlling the sorting vehicle to complete the resetting of the enclosing region comprises:

receiving a resetting notification signal from a resetting camera module, wherein the resetting notification signal comprises a resetting distance corresponding to a current position of the enclosing region; and sending resetting information to a processor of the one sorting vehicle according to the resetting notification signal so that the processor controls, according to the resetting information, a roller-type drive mechanism to drive an endless conveyor belt to move the resetting distance to complete the resetting of the enclosing region.

8. The method according to claim 7, after completing the resetting of the enclosing region, further comprising:

receiving a tuning notification signal from a tuning camera module, wherein the tuning notification signal comprises a tuning distance corresponding to the current position of the enclosing region; and sending tuning information to the processor of the one sorting vehicle according to the tuning notification signal so that the processor controls, according to the tuning information, the roller-type drive mechanism to drive the endless conveyor belt to move the tuning distance to update a resetting position of the enclosing region.

9. The method according to claim 6, before in response to determining that the one sorting vehicle travels to the corresponding unloading region, sending the unloading signal to the one sorting vehicle, further comprising:

positioning a position of the goods according to the binding information determined by the code scanning module and a travel speed of the one sorting vehicle.

10. The system according to claim 1, wherein the enclosing mechanism comprises a stopping bar disposed on the vehicle body or on the endless conveyor belt and perpendicular to the traveling direction of the vehicle body.

11. The system according to claim 1, wherein the enclosing mechanism comprises at least two stopping flanges disposed on the endless conveyor belt and parallel to the traveling direction of the vehicle body, wherein two adjacently disposed stopping flanges of the at least two stopping flanges are capable of forming one enclosing region above the vehicle body.

12. The system according to claim 11, wherein the preset distance is greater than or equal to a shortest distance between two adjacent stopping flanges.

13. The goods sorting system according to claim 11, wherein three stopping flanges are disposed at equal intervals on the endless conveyor belt.

14. The goods sorting system according to claim 1, wherein the roller-type drive mechanism is a servo motor, the received unloading signal comprises an unloading direction, and the processor controls the servo motor to drive the endless conveyor belt on the vehicle body to move the preset distance in the unloading direction so that the part or all of the one enclosing region where the goods are placed rotates below the roller to complete the unloading of the goods within the one enclosing region in the unloading direction.

15. The goods sorting system according to claim 10, wherein the roller-type drive mechanism is a servo motor, the received unloading signal comprises an unloading direction, and the processor controls the servo motor to drive the endless conveyor belt on the vehicle body to move the preset distance in the unloading direction so that the part or all of the one enclosing region where the goods are placed rotates below the roller to complete the unloading of the goods within the one enclosing region in the unloading direction.

16. The goods sorting system according to claim 11, wherein the roller-type drive mechanism is a servo motor, the received unloading signal comprises an unloading direction, and the processor controls the servo motor to drive the endless conveyor belt on the vehicle body to move the preset distance in the unloading direction so that the part or all of the one enclosing region where the goods are placed rotates below the roller to complete the unloading of the goods within the one enclosing region in the unloading direction.

* * * * *